Patented Oct. 4, 1932

1,880,898

UNITED STATES PATENT OFFICE

PIERRE DREWSEN, OF SANDUSKY, OHIO, ASSIGNOR TO THE HINDE & DAUCH PAPER COMPANY, OF SANDUSKY, OHIO, A CORPORATION OF OHIO

PROCESS OF PREPARING STRAW PULP

No Drawing.  Application filed October 20, 1930. Serial No. 490,102.

The invention relates to the preparation of pulp from straw for use in the manufacture of paper and has for its object First, the simplification of the process;

Second, the reduction in the amount of chemicals used in the treatment;

Third, the obtaining of a product which in the manufacture of paper will have a higher degree of strength;

Fourth, to avoid to a great extent the formation of objectionable waste products such as ill smelling vapors and liquid waste.

With these objects in view the invention consists in the process as hereinafter set forth.

In the present state of the art the usual method of preparing straw pulp is to cook the same in rotary globe digesters with from ten percent to fifteen percent of lime. For instance, for a weight of fourteen thousand pounds of straw, sixteen hundred pounds of lime may be used with thirty-five hundred gallons of water, the mixture being cooked for eight hours under steam pressure of thirty pounds.

Other methods for preparing fibrous material for paper making above have been proposed and to some extent used, such as the use of sulphur in connection with lime. The great objection to such processes is the formation of many objectionable waste products, such as hydrogen sulphide and mercaptans. These when liberated into the atmosphere are so disagreeable in odor that the operation of plants of this character is generally prohibited. If on the other hand the escape of these waste products is prevented, this greatly complicates the process.

The present invention is based on the discovery that the amount of lime required for treatment of the straw can be materially reduced by the use therewith of a small quantity of sulphur. Also that where the amount of sulphur is held within certain limits, the formation of ill smelling waste products is avoided. As a specific example, instead of using sixteen hundred pounds of lime per fourteen thousand pounds of straw, I use only eight hundred pounds and less than one per cent of sulphur, based on the dry weight of the straw. In fact, excellent results have been obtained by the following formula: 14,000 pounds dry straw, 3500 gallons water, 720 pounds unslaked high calcium lime and 40 pounds of sulphur, this being cooked for six to eight hours at 30 pounds steam pressure. Straw cooked this way comes out of the rotary in a state fully as tender as when cooked with lime alone and after properly subjecting it to the well known beater and Jordan treatments it runs very well on the paper machine and forms a sheet which can be produced at high speed and which has excellent corrugating qualities, somewhat superior to a straight lime cooked straw sheet.

If the sulphur content of the above formula is increased much above 40 pounds per rotary of approximately 14,000 pounds straw, mercaptans and other organic sulphur compounds and hydrogen sulphide are formed in such quantity as to be obnoxious when the rotary is blown off, although no harm is done to the fibre, except that its sulphur content is increased by organically combined sulphur which tends to impart a characteristic "sulphur" odor to the fibre and to the paper made from it; and this may be undesirable for a number of purposes. Furthermore, it will in all probability be necessary to blow the rotaries off into a closed tank and make still further provisions to dispose of the organic sulphur compounds, mercaptans, hydrogen sulphide, etc., in order to prevent atmospheric pollution and the consequent complaints from local settlements.

By my method, I avoid the necessity for treating rotary digester exhaust steam and I keep the sulphur content of the stock at a minimum and the paper free from odor. Furthermore, I avoid the danger of accidental anaesthesia and even of asphyxiation which generally attends the presence or use of hydrogen sulphide or mercaptans.

The advantage of my method is that it accomplishes the same purpose as the straight lime process with identically the same equipment but at approximately half the chemical cost and makes a pulp stock which is stronger, and more easy to wash, or if washing is dispensed with, my stock being lower in lime content, will make a paper of a lower ash percentage and will deposit only a minimum of lime on the paper machine wires and thereby reduce shut down periods necessary for removing such lime deposits with acid.

I attribute the benefits of this process to the fact that more calcium ions go into solution and consequently the lime becomes more chemically active in the presence of sulphur or sulphur compounds. Its activity is indicated by the fact that stock cooked by my process is neutral to phenolphthalein whereas straight lime cooked stock is decidedly alkaline. Carbon bi-sulphide, hydrogen sulphide, ethyl sulphhydrate and even soluble xanthates added to a rotary containing lime, straw and water will produce the same general effect as sulphur. For example, 50 pounds of carbon bisulphide or ethyl sulfhydrate or the like will materially reduce the lime necessary to cook a 14,000 pound rotary of straw, but naturally, these materials are not to be regarded favorable on account of their extreme inflammability, and disagreeable odor.

Magnesium oxide does not react with sulphur in aqueous solution. Its presence in lime is not deleterious however, unless an excessive amount tends to increase the quantity of mineral filler in the sheet.

What I claim as my invention:

1. The method of preparing straw pulp for paper which consists in cooking the straw with water and less than ten per cent of lime, based on the dry weight of the straw, and a relatively small amount of chemical agent containing sulphur.

2. The method of preparing straw pulp for paper which consists in cooking the straw with water and less than ten per cent of lime, together with a reagent containing less than one per cent of sulphur, based on the dry weight of the straw.

3. The method of preparing straw pulp for paper which consists in cooking the straw under elevated steam pressure with water, lime and a reagent containing sulphur, the lime and sulphur being restricted in quantity to respectively less than ten percent and less than one per cent, based on the dry weight of the straw.

In testimony whereof I affix my signature.

PIERRE DREWSEN.